July 7, 1970  A. CINQUE ET AL  3,519,802
CARDS EMPLOYING CAPACITOR SENSING OF ENCODED DATA
Filed Nov. 27, 1968  2 Sheets-Sheet 1
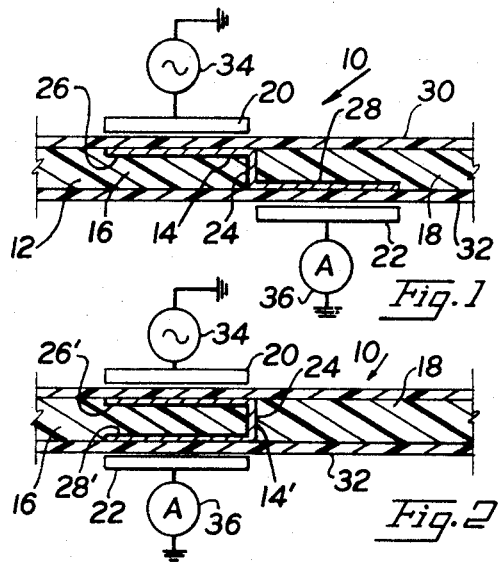
Fig. 1
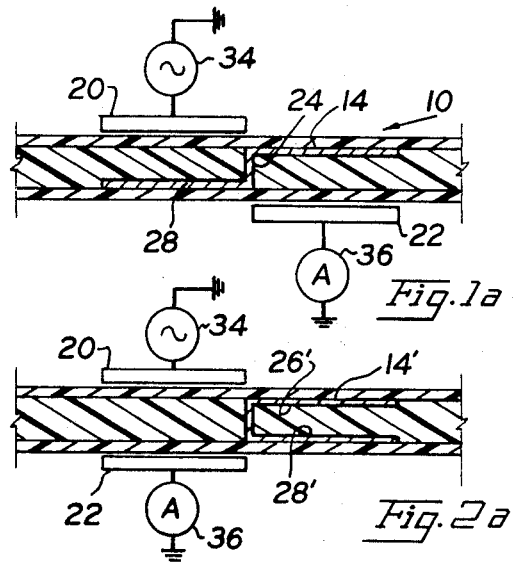
Fig. 1a
Fig. 2
Fig. 2a
Fig. 3
INVENTORS
ALPHONSE CINQUE
MAX NORMAN SCHWEIZER
BY
Edward H Loveman
ATTORNEY INVENTORS
ALPHONSE CINQUE
MAX NORMAN SCHWEIZER
BY
Edward H. Loverman

ATTORNEY 3,519,802
CARDS EMPLOYING CAPACITOR SENSING OF
ENCODED DATA
Alphonse Cinque, Lynbrook, and Max Norman Schweizer,
Bay Shore, N.Y., assignors to Securadyne Ltd., a corporation of New York
Filed Nov. 27, 1968, Ser. No. 779,447
Int. Cl. G06k 7/08
U.S. Cl. 235—61.11                                    9 Claims

ABSTRACT OF THE DISCLOSURE

An improved credit card and the like which includes internally coded data by which it is possible to uniquely identify the proper holder of the card. The encoded data takes the form of a plurality of conductive members having portions thereof in different planes whereby, with the aid of external sensing means, it is possible to generate preselected areas of maximum and minimum capacitance within the card.

---

This invention relates to credit cards and more particularly relates to credit cards employing internally coded information by which it is possible to identify the proper holder of such cards.

Credit cards have become a way of life to a large segment of the population of the United States and indeed the world. With a credit card in his possession, the holder can purchase, that is charge, an endless variety of goods and services. However, the relative ease of transacting a credit card purchase creates serious problems when the cards fall into the hands of unauthorized users.

Almost everyone who has given this matter serious consideration will agree that the major problem with credit cards, insofar as unauthorized holders are concerned, is the fact that typically such cards visually bear the name of the issuee of the card. In fact, it is the signature of the issuee which is matched with the name on the card which is supposed to establish the validity of the transaction. The problem is that an unauthorized holder of the card, a person prone to purchase an item on someone elses credit card, need only forge the signature of the person whose name appears on the card. Since it is a relatively easy matter for a dishonest person to steal and use a credit card in a location or store where the proprietor does not know the proper issuee of the card, there is very little likelihood of the forgery being detected.

Thus, in recent years there have been attempts to produce credit cards which do not visually display identifying data of the issuee thereof. For instance, in a recent U.S. Pat. 3,387,265, issued June 4, 1968 to W. Smeiman, there is disclosed a credit card system wherein the card thereof does not visually display identifying indicia but instead carries such information in the form of internally coded data which only the proper holder of the card would be aware of. In the Smeiman patent, it is envisioned that the holder would have to present the credit card to the seller of the goods or services who in turn prepares a validating token from information supplied by the holder, which when combined with the credit card, establishes a predetermined capacitive network which can be sensed to establish the validity of the transaction. Unfortunately, the Smeiman system, and indeed other prior art systems which have attempted to utilize internally coded information to validate credit card sales, have been cumbersome in use, relatively complex, and therefore expensive to implement. Accordingly, and despite the fantastic amount of unauthorized credit card sales which take place each year, the industry has yet to devise a system which can effectively eliminate the problems involved.

The instant invention, like the aforementioned Smeiman patent, is directed to a credit card or like instrument, which includes internally coded information by which the validity of a credit card transaction can be determined, and by which unauthorized credit card transactions can be eliminated. However, unlike the Smeiman patent, the internally coded credit card of the instant invention is simple, easy to use, inexpensive to manufacture, and requires a minimum effort on the part of a vendor to effectuate a validation check.

Thus, and as will be described in greater detail, the credit card of the instant invention includes means internally located therein for producing a preselected pattern of maximum and minimum capacitive areas which can be easily sensed by the utilization of a pair of validating sensing plates located on opposite sides of the credit card. Therefore, and in contradistinction to the necessity of preparing a validating token, as required in the Smeiman patent, a vendor who wishes to check the validity of a transaction which involves a card of the instant invention, need only place the card in the validation equipment between the plates thereof which are adjusted in accordance with information supplied by the card holder to determine whether or not the reading produced as an output from said sensor corresponds to a predetermined value. Since only the issuee of the card knows the hidden information content of the card, unauthorized transactions are thereby simply and easily prevented.

As a particular advantageous feature of the instant invention, the means for establishing the preselected pattern of maximum and minimum capacitive areas within the card comprises a plurality of conductive members having portions thereof offset from one another. By simply prearranging the orientation of the various offset portions of the conductive members, it is a relatively simple matter to establish the aforementioned maximum and minimum capacitive areas in a coded form which can thereafter be decoded by the externally located sensor plates of the validation equipment.

As a further particularly advantageous feature, each plurality of conductive members which are to define a particular character of information, are integrally joined to one another to define a unitary structure which can be easily located internally of the composite body of insulating material which defines the major portion of the card.

Accordingly, it is an object of the instant invention to provide a credit card, token, or the like which employs internally coded information therein by which the propriety of a credit card transaction can be easily validated while at the same time unauthorized transactions are positively eliminated.

Another object of the instant invention is to provide such a credit card which employs a conductive pattern internally thereof for producing areas of capacitance when a pair of sensing plates of the validation equipment are located on opposite sides thereof.

Another object of the instant invention is to provide such a credit card wherein the aforementioned conductive pattern for establishing capacitive areas comprises a plurality of conductive members having offset portions thereof which are selectively coded with respect to one another in such a manner as to locate themselves either relatively close to, or remote from the sensing plates of the validation equipment.

Yet another object of the instant invention is to provide such a credit card employing a plurality of offset conductive members arranged to define maximum and minimum capacitive areas with respect to a pair of plates wherein such conductive members are integrally joined to define a unitary structure which can be easily located internally of the composite insulative body member which defines the major portion of the credit card.

Another object of the instant invention is to provide such a credit card employing conductive members having offset portions disposed on opposite sides of a central portion thereof whereby the possibility of discovering the encoded pattern by X-ray examination is eliminated.

Yet another object of the instant invention is to provide such a credit card employing internally located identifying data which can be detected by simple, inexpensive, and easy to use validating equipment.

These and other objects and many of the attendant advantages of this invention will readily be appreciated as the same becomes better understood by reference to the following detailed description when considered in connection with the accompanying drawings, wherein:

FIG. 1 is a cross sectional view of a credit card constructed in accordance with the instant invention, which card is arranged to produce a maximum capacitive area therein;

FIG. 1a is a cross sectional view similar to that of FIG. 1 but which illustrates a card designed to produce a minimum capacitive area therein;

FIG. 2 is a cross sectional view of an alternative embodiment of the instant invention arranged to produce a maximum area therein;

FIG. 2a is a view similar to the view of FIG. 2 but which illustrates the manner of achieving a minimum capacitive area therein;

Figure 4:
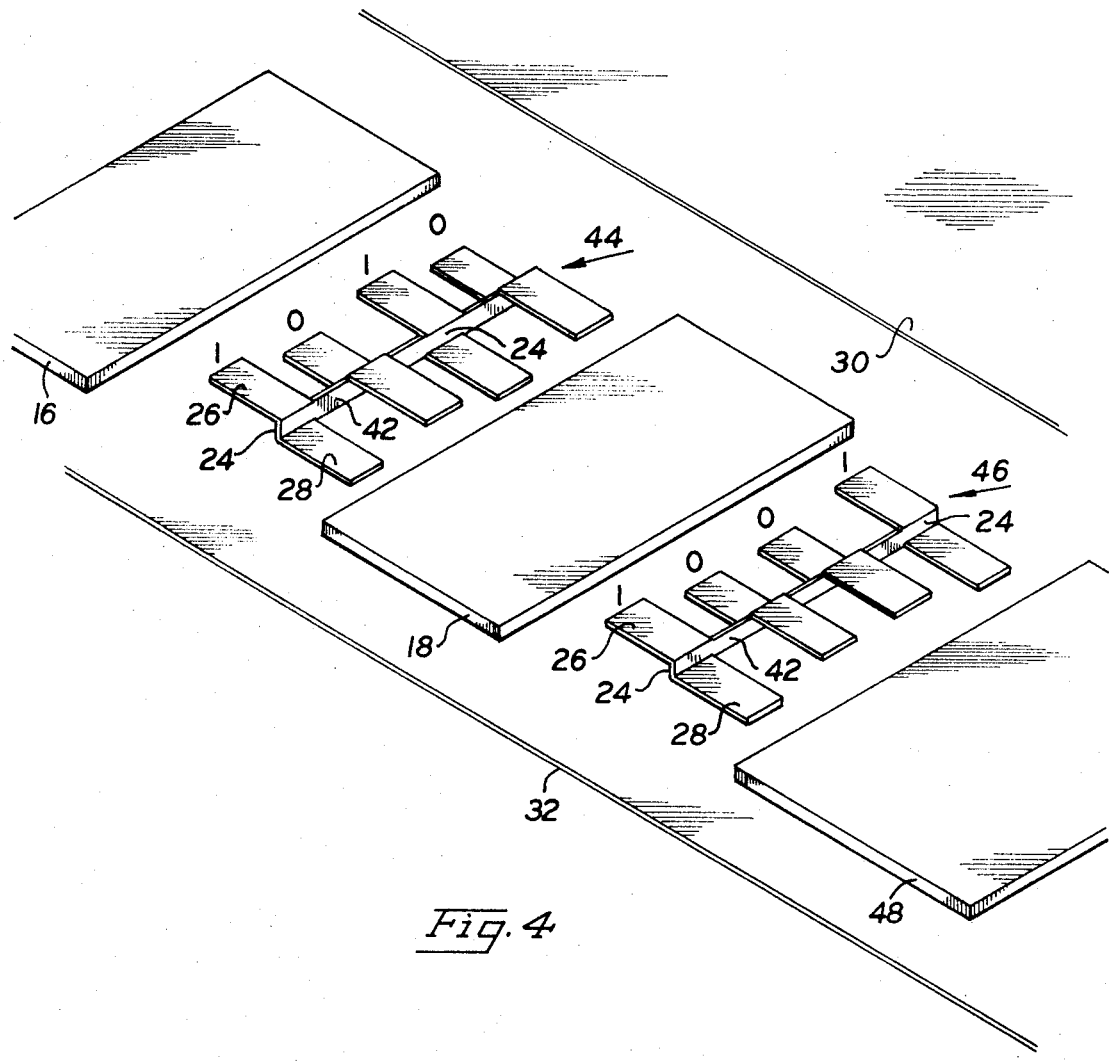

FIG. 3 is a perspective view of a credit card constructed in accordance with the instant invention and particularly illustrates the manner in which a plurality of metallic members can be arranged to represent in binary form, a decimal numeral, and FIG. 4 is a perspective view of a credit card constructed in accordance with the instant invention illustrating a number of features to be further described herein.

With reference to the figures, wherein like numerals indicate like parts, FIGS. 1 and 1a illustrate the basic principles of the instant invention. Thus in FIG. 1, a credit card is disclosed which includes a body 12 of insulating material and a relatively thin conductive plate 14 internally thereof. As is to be explained, the conductive plate 14 can be selectively oriented within the body member 12 to define a maximum or minimum capacitive area whereby informatoon can be stored within the card 10. However, before going into further detail, it should be apparent that although the card 10 is designated a credit card, and therefore immediately denotes certain types of transactions, it is to be understood that the instant invention has broader application than the typical credit card transaction and indeed is applicable to each and every environment where it is desirable to provide internally stored information by which unauthorized use of such cards is prevented. Thus in addition to typical charge purchasing programs, the card of the invention might be carried by employees within an organization and serve as an authoritative identification thereof. Similarly, a card of the instant invention might be issued to a particular guest at a hotel (in accordance with his room number) and provide the means for charging various services such as bar, restaurant, beauty parlor, etc. These examples are illustrative of the many potential uses for the card of the instant invention.

As best seen in FIG. 1, the body 12 includes first and second internal sections 16 and 18 of insulative material which, as will be described, functions as an internal dielectric for a composite capacitor structure to be defined by the internal conductive plate 14 and a pair of externally disposed sensing plates 20 and 22 which form part of the validation equipment. The internal conductive plate 14 comprises a central portion 24, sandwiched between the insulative sections 16 and 18, and a first and a second planar portion 26 and 28 respectively, extending from the opposite ends of the central portion 24, and which are thereby necessarily situated in different planes or offset with respect to one another. Preferably, the plate 14 is of one piece construction but if desired, other techniques of manufacture such as depositing might be utilized to place the desired pattern on the sections 16 and 18. Relatively thin top and bottom insulative cover portions 30 and 32 respectively complete the assembly.

Notwithstanding that FIG. 1 illustrates the most elementary application of the instant invention, that is the provision for internally storing but a single bit of information, this embodiment does illustrate the fundamental principles of the invention. Thus with the conductive plate 14 oriented as shown in FIG. 1, it will be appreciated that the distance between the plate 20 and the portion 26, and the distance between the sensor plate 22 and the portion 28, are relatively small, such that a relatively large capacitance is defined between the plates 20 and 22. Therefore, if a source of AC current 34 is applied to the sensor plate 20, a relatively large current will be sensed by an ammeter 36 connected in series between the sensor plate 22 and ground. With this simple validation equipment, the presence of a "1," in other words the detection and recognition of an internally stored bit of information is a simple matter. Of course, if desired, other sensing techniques can be utilized to detect the internally stored information.

FIG. 1a illustrates the same credit card 10 but with the plate 14 arranged to provide a "zero" bit of information. That is by re-orienting the portions 26 and 28 of a plate 14 as shown, such that they are relatively remotely located from the sensing plates 20 and 22, the capacitive structure defined thereby (including larger distances from the plates 20 and 22 to the internally located conductive plate therebetween) will produce a smaller reading on the ammeter 36 by which it will be a simple matter to determine the presence of a "zero."

Turning to FIGS. 2 and 2a, wherein like numerals designate corresponding elements and primed numerals indicate slight variations, there is illustrated an alternative embodiment of the instant invention. Unlike FIGS. 1 and 1a where the portions 26 and 28 of the conductive member 14 are disposed on opposite sides of the central portion 24 thereof, in FIGS. 2 and 2a, the first and second portions 26' and 28' of the conductive member 14' are disposed on the same side of the central portion 24 thereof. The principle of operation remains the same however.

In the embodiment of FIG. 2, the close location of the electrically connected portions 26' and 28' with respect to the sensing plates 20 and 22 will establish a maximum capacitive structure, whereas in FIG. 2a the relatively remote location of the electrically connected portions 26' and 28' of the conductive plate 14' with respect to the sensing plates 20, 22 will establish a relative minimum capacitance whereby the information can be distinguished. It may be pointed out that the embodiments of FIGS. 1 and 1a are preferred since X-ray examination in a direction normal to the top cover 30 of the card 10 will not reveal the particular orientation of the portions 26 and 28. However, it should be noted that regardless of the direction of X-ray examination of the card illustrated in FIGS. 3 and 4, the particular orientation of the conductive portions will not be revealed.

Turning to FIG. 3, the basic principles of the instant invention have been expanded to illustrate a credit card 10 which can store up to 15 different patterns and as shown, represents by conventional binary character 15. Thus the credit card 10 of FIG. 3 includes a plurality of four conductive plates 14 whose portions 26 and 28 may be arranged in binary form to produce the characters 0–15 when sensed with four pairs of plates 20 and 22 (not shown in FIG. 3). Taking the plate portions 28d and 26d which are at the right-most position as viewed in FIG. 3, it will be appreciated that if these portions 28d and 26d were reversed, rather than represent the character 15, the four plates 14 would add up to "14" using standard binary representation (1110). The plates 14 may be manufactured from thin electro conductive foils, spraying a thin metallic film in a coded pattern on a dielectric base and by many other conventional methods well known in the art.

FIG. 3 also illustrates the manner in which the issuee of the card 10 would receive the card 10 from the issuer. Namely, the cards would be provided with a removable tab 38 visibly displaying as at 40 the information internally carried by the credit card 10. The issuee would remove the tab 38 such that he and only he would know the information stored in the card 10. When he presented the card for validation, he would communicate this information to the operator of the validation equipment or feed such information into automatic equipment such that the validation equipment could compare the information conveyed by the issuee with the information generated by the capacitive areas defined by the plates 14.

Turning to FIG. 4, there is illustrated a number of features of the instant invention. First, it may be seen that the individual central portions 24 of the conductive plates 14 have been integrally joined by a web 42 of similar conductive material. The net result is a unitary structure embodying a plurality of plates 14 preselectively arranged to produce a particular character. In the illustrated example, the unitary structure 44 is arranged to produce by conventional binary representation the character "1010."

The unitary structure 44 also facilitates the construction of the credit cards of the instant invention. Thus it may be appreciated that the insulating sections 16 and 18 which actually define the dielectric for the various capacitors may be brought into almost contacting relationship with respect to one another to sandwich the web 42 (including the central portions 24) therebetween with the portions 26 and 28 overlaying the upper and lower surfaces of the sections 16 and 18.

FIG. 4 also illustrates the manner in which the principles of the instant invention may be extended so as to produce cards capable of storing more information. Thus a second unitary structure 46 comprising a plurality of plates 14 integrally joined by the web 42 is arranged to produce, in the example, by conventional binary representation, the character 9. It may also be pointed out that when additional pluralities of conductive plates 14 are utilized such as in the unitary structure 46, appropriate additional insulative sections 48 are added to provide the necessary dielectric material for the capacitive network defined thereby and also for the purpose of sandwiching the unitary structure 46 between the sections 18 and 48 to produce a compact construction.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Card means for identifying the proper holder thereof, said card means comprising:
   a body of insulating material,
   conductive pattern means located within said body of insulating material for producing preselected maximum and minimum areas of capacitance in said body when first and second sensing plates are located on opposite sides of said card means,
   said conductive pattern means comprising:
      a first plurality of conductive members each having a first and a second portion and lying on different planes which are separated by the insulating material each of said first and second portions being joined together by a central portion which is on a plane normal to the planes in which said first and second portions lie whereby a maximum area of capacitance is defined when said first and second sensing plates are located relatively close to said first and second portions respectively as compared to a minimum area of capacitance defined when said first and second sensing plates are located relatively remote from said first and second portions respectively.

2. The card means of claim 1, wherein said body of insulating material includes a first and a second insulation section lying in spaced parallel planes and having sandwiched transversely therebetween said central portions of said first plurality of conductive members, and wherein said first and second portions of said first plurality of conductive members overlay the upper and lower surfaces of said first and second insulating sections respectively, and have a top and a bottom cover portions which cover said first and second portions of said first plurality of conductive members respectively.

3. The card means as recited in claim 2 wherein the individual central portions of said conductive members are integrally joined to one another by a web of similar conductive material, and said first and second portions of each conductive member are integrally joined to their respective central portions, whereby a unitary structure is defined.

4. The card means as recited in claim 1 wherein a preselected code can be encoded into said body by preselectively choosing the number of said first portions of the respective conductive members which will be in the same plane.

5. The card means as recited in claim 1 wherein said plurality of conductive members are integrally joined to one another.

6. The card means as recited in claim 1 wherein said conductive pattern means further includes a second plurality of conductive members each having first and second portions thereof lying in different planes.

7. The card means as recited in claim 1 wherein said body of insulating material includes a first and a second insulating section lying in spaced parallel planes and having sandwiched transversely therebetween said central portions of said first plurality of conductive members, and wherein said first and second portions of said first plurality of conductive members which overlay the upper and lower surfaces of said first and second insulating sections, and have a top and a bottom cover portion adapted cover said first and second insulating sections respectively, and wherein said second plurality of conductive members include central portions thereof in parallel alignment, and wherein said body of insulating material includes a third insulating section intermediate said top and bottom cover portions, said central portions of said second plurality of conductive members sandwiched transversely between said second and third insulating sections with selected ones of said first and second portions of said second plurality of conductive members overlaying the upper and lower surfaces of said second and third insulating sections.

8. The card means as recited in claim 1 wherein said body of insulating material includes a removable tab which visibly carries information corresponding to said preselected maximum and minimum areas of capacitance.

9. The card means as recited in claim 4 wherein said body of insulating material includes a removable tab which visibly carries information identifying said preselected code.

References Cited

UNITED STATES PATENTS

| | | | |
|---|---|---|---|
| 2,294,681 | 9/1942 | Moon | 235—61.11 |
| 2,478,274 | 8/1949 | Johnson | 235—61.12 X |
| 2,774,060 | 12/1956 | Thompson | 235—61.12 X |
| 2,848,163 | 8/1958 | Van Horne Serrell | 235—61.12 |
| 3,387,265 | 6/1968 | Smeiman. | |

OTHER REFERENCES

Xylander, "CCROS' Document," IBM Technical Disclosure Bulletin, vol. 9, No. 1, June 1966, p. 41.

MAYNARD R. WILBUR, Primary Examiner

T. J. SLOYAN, Assistant Examiner